United States Patent [19]
Guski et al.

[11] Patent Number: 5,661,807
[45] Date of Patent: Aug. 26, 1997

[54] AUTHENTICATION SYSTEM USING ONE-TIME PASSWORDS

[75] Inventors: Richard Henry Guski, Red Hook; Raymond Craig Larson, Rhinebeck, both of N.Y.; Stephen Michael Matyas, Jr.; Donald Byron Johnson, both of Masassas, Va.; Don Coppersmith, Ossining, N.Y.

[73] Assignee: International Business Machines Corporation, Armonk, N.Y.

[21] Appl. No.: 516,889

[22] Filed: Aug. 18, 1995

Related U.S. Application Data

[63] Continuation of Ser. No. 99,784, Jul. 30, 1993, abandoned.
[51] Int. Cl.$^6$ .................... H04L 9/00; H04L 9/32
[52] U.S. Cl. .................... 380/25; 380/23; 380/29; 380/37; 380/49; 340/825.31; 340/825.34
[58] Field of Search ................ 380/4, 9, 23, 25, 380/28, 29, 37, 44, 46, 49, 50; 340/825.31, 825.34

[56] References Cited

U.S. PATENT DOCUMENTS

| | | | |
|---|---|---|---|
| 4,885,778 | 12/1989 | Weiss | 380/23 X |
| 5,023,908 | 6/1991 | Weiss | 380/23 |
| 5,168,520 | 12/1992 | Weiss | 380/23 |
| 5,367,572 | 11/1994 | Weiss | 380/23 |

OTHER PUBLICATIONS

"Data Encryption Standard" (FIPS Pub 46); U.S. Dept. of Commerce, Nat. Bureau of Standards, Washington, D.C.; Jan. 15, 1977.

*Primary Examiner*—Bernarr E. Gregory
*Attorney, Agent, or Firm*—William A. Kinnaman, Jr.

[57] ABSTRACT

A system for authenticating a user located at a requesting node to a resource such as a host application located at an authenticating node using one-time passwords that change pseudorandomly with each request for authentication. At the requesting node a non-time-dependent value is generated from nonsecret information identifying the user and the host application, using a secret encryption key shared with the authenticating node. The non-time-dependent value is combined with a time-dependent value to generate a composite value that is encrypted to produce an authentication parameter. The authentication parameter is reversibly transformed into an alphanumeric character string that is transmitted as a one-time password to the authenticating node. At the authenticating node the received password is transformed back into the corresponding authentication parameter, which is decrypted to regenerate the composite value. The non-time-dependent value is replicated at the authenticating node using the same nonsecret information and encryption key shared with the requesting node. The locally generated non-time-dependent value is combined with the regenerated composite value to regenerate the time-dependent value. The user is authenticated if the regenerated time-dependent value is within a predetermined range of a time-dependent value that is locally generated at the authenticating node.

14 Claims, 10 Drawing Sheets

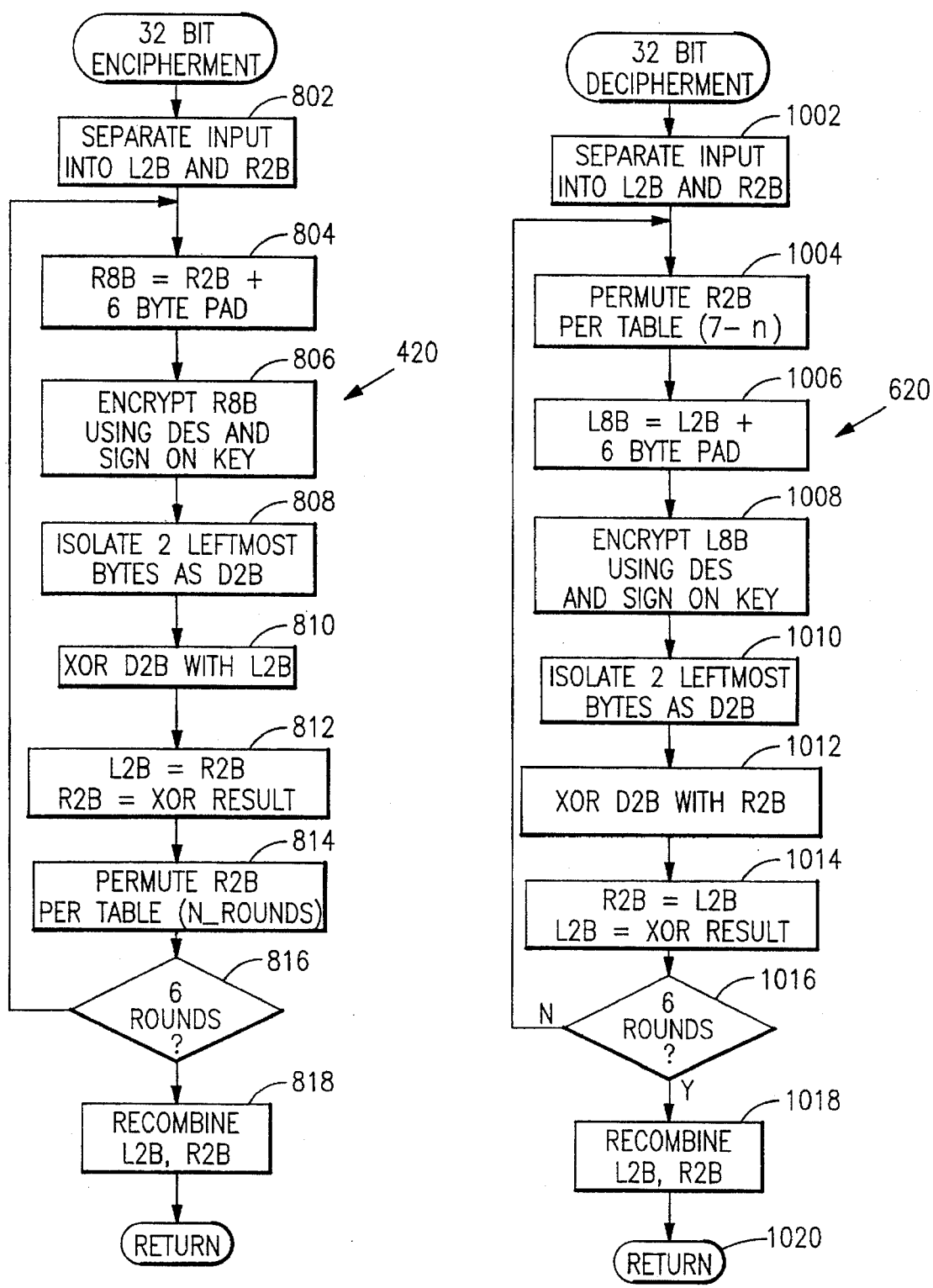

AUTHENTICATION SYSTEM USING ONE-TIME PASSWORDS

This application is a continuation of application Ser. No. 08/099,784 filed Jul. 30, 1993, now abandoned.

BACKGROUND OF THE INVENTION

1. Field of the Invention

This invention relates to an authentication system and, more particularly, to a system for authenticating a user located at a requesting node to an authenticating node coupled to the requesting node by a communications channel, using one-time passwords.

2. Description of the Related Art

Systems for authenticating users to system resources such as user applications are well known in the art. Many such systems operate by using passwords that are generally known only to the user and issuer or authenticator. Systems that transmit such passwords over a communications channel from a resource-requesting node (e.g., a workstation or ATM terminal) are vulnerable to the interception of transmitted passwords by unauthorized persons who may tap into the communications channel. Such persons may thereafter attempt to gain unauthorized access to system resources by using the intercepted passwords together with such nonsecret information as a user ID which may also have been intercepted.

To thwart such attempts to gain unauthorized access, passwords are usually transmitted over communications channels in encrypted form, so that access to the communications channel does not yield the password itself in plaintext form. However, even systems that encrypt passwords before transmission are vulnerable to the possibility that a person may record the encrypted password and thereafter inject the encrypted password directly into the communications channel (rather than through a terminal and encryption device) to secure the desired access.

To counter this more sophisticated challenge, recent systems have used so-called "one-time" or "dynamic" passwords that are valid for only a brief time interval (e.g., a minute or less), so that interception of such a password during one interval provides no useful information for gaining access to a system during a later interval. Authentication systems of this type are described in Vaughan U.S. Pat. No. 4,800,590 and Weiss U.S. Pat. No. 4,885,778, as well as in the commonly assigned, copending application of applicant Richard H. Guski, Serial No. 08/012,087, filed Feb. 1, 1993, and entitled "Method and Apparatus for Securing Communications in a Distributed Data Processing System", the specifications of which are incorporated herein by reference. In the system described in the copending application, for example, a one-time password is generated by a requesting product or function (or by the host authentication system at the request of another program) and used instead of the user's regular host authentication password when an end user logs onto a host application or is otherwise authenticated by the host authentication system. It is a secure way to access host applications because the user's real host authentication password does not have to flow across the network in clear text, nor can the one-time password be reused if intercepted.

Systems of the type described in these references generate their one-time passwords as a function of secret information (such as a user password or an encryption key), time-dependent information such as a time-of-day (TOD) value or a time/date value, and, optionally, nonsecret information such as a user ID and application ID. The one-time password is transmitted to the authenticating node, where it is compared with a comparison password generated in a similar manner using the same secret information and nonsecret information, if any, together with a time value available at the authenticating node. If the transmitted password agrees with the comparison password, the user is authenticated and granted access to the system resource.

The system described in the above-identified copending application has a performance problem at the authenticating end, since the only way in that system to ensure that the incoming one-time passwords are valid and not intrusion attempts is to generate a corresponding one-time password and compare the incoming one-time password with the generated one. The generation of one-time passwords requires repeated uses of the DES encryption procedure, which is computationally intensive. This problem is further compounded because the input to the one-time password generation process involves time information as one of the input variables. Because no two computer clocks are ever set exactly the same and a delay can occur while the one-time password is in transit, multiple passes through the procedure for various time values centered about the current clock value of the validating computer are necessary.

The necessity for generating multiple comparison passwords would be avoided if the original time/date value could be recovered from the received one-time password for direct comparison with the time/date value available at the authenticating node. However, in the system described in the copending application, this is not possible. In that system, each byte of a 64-bit time-dependent encryption product (from which the original time/date information could be recovered) is converted to a corresponding alphanumeric character (A-Z, 0-9) of the password using a byte-to-character translation table. Since each 8-bit byte of the time-dependent encryption product may have one of 256 possible values, whereas each alphanumeric character may have one of only 36 possible values, the byte-to-character translation table necessarily uses a many-to-one mapping, so that neither the 64-bit encryption product nor the original time/date value may be recovered from the received password at the authenticating node. Therefore, it is necessary to generate comparison passwords from trial time values, as indicated above.

The second problem, also related to performance, is that the system described in the copending application generates one-time passwords that are indistinguishable from other possible password character combinations. That is to say, since each 8-character password could have been generated from any one of a large number of 64-bit time-dependent encryption products, no password can be trivially rejected. This means that when the authenticating node receives an invalid password, that password must be passed through the entire password procedure for each of the possible time values, which may number in the hundreds. The invalid password will fail validation, but much computational power is wasted in this process.

SUMMARY OF THE INVENTION

In one aspect, the present invention contemplates an authentication system in which an authentication parameter (AP) is generated as a function of time-dependent information, preferably time-of-day (TOD) information, using a predetermined first transformation, the predetermined first transformation having an inverse transformation such that the time-dependent information may be regenerated from the authentication parameter using the inverse transformation. A time-dependent password comprising a character string, preferably an alphanumeric character string, is generated from the authentication parameter using a predetermined second transformation, the predetermined second transformation having an inverse transformation such that the authentication parameter may be regenerated from the password using the inverse transformation.

(Unless otherwise indicated, reference to an inverse transformation in this context means not only that the inverse transformation exists, but also that it is computationally feasible to generate; transformations that have such computationally feasible inverse transformations are said to be "invertible", while those that do not are said to be "noninvertible" or "one-way" transformations or functions.)

The password is presented to an authenticator, which is typically located at an authenticating node to which the password is transmitted from the requesting node. The authenticator regenerates the time-dependent information from the password by (1) regenerating the authentication parameter from the password presented to the authenticator using the inverse of the second transformation and then (2) regenerating the time-dependent information from the authentication parameter using the inverse of the first transformation.

The authenticator compares the regenerated time-dependent information with reference time-dependent information and grants access to a resource in accordance with the comparison of the regenerated time-dependent information with the reference time-dependent information. More specificly, if the regenerated time value is within a predetermined tolerance of the original time value, the authentication request is granted; otherwise, it is denied.

Preferably, the first transformation is a cryptographic transformation using an encryption key shared with the authenticator; the cryptographic transformation is such that the time-dependent information can be regenerated from the authentication parameter and the key, but the key cannot be regenerated from the authentication parameter and the time-dependent information. In such a case, the authenticator regenerates the original time-dependent information by decrypting the regenerated authentication parameter using the decryption key corresponding to the original encryption key. (In the disclosed system, using the disclosed encryption procedures, the encryption key is identical to the corresponding decryption key; however, with other encryption procedures, the encryption key may differ from the corresponding decryption key, although the two are obviously interrelated.)

The authentication parameter is preferably generated by combining the time-dependent information with non-time-dependent information to generate composite information and encrypting the composite information to generate the authentication parameter. The non-time-dependent information is preferably generated by encrypting nonsecret information (e.g., a user ID or application ID) identifying a request for authentication.

By using an invertible transformation to convert the authentication parameter into a password, one is able to regenerate the original time-dependent information and validate the password on the basis of only a single comparison, between the regenerated time-dependent information and reference time-dependent information available at the authenticating node. This aspect of the present invention stands in contrast to the system described in the copending application, in which the original time-dependent information cannot be regenerated from the password, necessitating the generation of a comparison password for comparison with the received password for each permissible value of the original time-dependent information. In this respect alone, the password generation procedure disclosed herein is much less computationally intensive than the procedure disclosed in the copending application, and wastes no resources.

Preferably, the authentication parameter has a first plurality of possible values (e.g., $2^{32}$ for a 32-bit AP), while the password or other authentication code has a second plurality of possible values (e.g., $36^8$ for a password of 8 alphanumeric characters) greater than the first plurality of values. (Reference to possible values in this context is without regard to intercharacter constraints that may be imposed by the particular system used to generate the AP or password; passwords that may be "illegal" are nevertheless counted among the possible password values.) A special block encryption procedure described herein, having a 32-bit input and a 32-bit output, is used to generate the desired 32-bit authentication parameter.

The authenticator determines whether the password has a corresponding authentication parameter from which the password could have been generated. The authenticator further processes the password if it has a corresponding authentication parameter. Otherwise, the authenticator rejects the password without further processing.

Preferably, the authentication parameter comprises a first plurality of bits (e.g., 32 bits), while the password or other authentication code comprises a second plurality of bits greater than the first plurality (e.g., 64 bits for an 8-character password). Each set of password bits is generated as a function of a corresponding set of bits of the authentication parameter, which preferably overlap one another to create an intercharacter correspondence By using a set of authentication parameters that map to only a subset of the possible passwords, one makes it possible for the authenticator to trivially reject most randomly generated passwords, using only noncryptographic tests that are much less computationally intensive than the cryptographic transformations used at later stages of the validation procedure. Only the small number of passwords that pass the noncryptographic test must undergo the further testing that involves cryptographic operations.

For example, if a 32-bit authentication parameter is used, such an authentication parameter would have $2^{32}$ or about $4.3 \times 10^9$ possible values, whereas a password of 8 alphanumeric characters (A–Z, 0–9) would have $36^8$ or about $2.8 \times 10^{12}$ possible values. Such a 32-bit authentication parameter therefore maps to only a very small subset of the possible passwords (about 0.15% in the example given). The overwhelming majority of randomly generated passwords, which do not belong to this subset, may therefore be trivially rejected without requiring any cryptographic processing. This aspect of the invention thus further minimizes the amount of unnecessary computations. By contrast, the 64-bit authentication parameter generated in the copending application has $2^{64}$ or about $1.8 \times 10^{19}$ possible values. Such a large authentication parameter space cannot be mapped to even the entire password space in an invertible one-to-one fashion, much less to a small subset of the password space; it is this noninvertibility that necessitates the process described in the copending application of generating comparison passwords for each trial time value.

Yet another aspect of the present invention contemplates a system for transforming (i.e., encrypting or decrypting) an input data block containing n bits into an output data block containing n bits, where n is an even integer, in which the input data block is first partitioned into first and second (preferably, left and right) halves each containing n/2 bits. The two halves of the input data block are then subjected to a plurality of rounds in which first and second input halves are transformed into first and second output halves serving as the corresponding input halves for the subsequent round. At the end of the rounds, the first and second halves are recombined to produce the output data block.

On each round, the first input half is padded with padding bits to generate a m-bit input value (where m>n/2), which is encrypted using a predetermined m-bit encryption procedure (preferably DES, with m being 64 and using the same key for each round) to generate a m-bit output value. Predetermined bits of the m-bit output value are selected to form an n/2-bit output value. The first output half for the round is generated as a function of the modulo 2 sum of the n/2-bit output value and the second input half for the round, while the second output half for the round is derived from the first input half for the round. At least one of the operations on each round involves a permutation, which is different for each round, of a set of n/2 input bits to yield n/2 output bits.

The present invention, as described above, allows input data blocks of arbitrary size to be transformed into output data blocks of similar size while preserving all the information in the input block for recovery by an inverse transformation. This is valuable in many situations (such as the one described herein involving the 32-bit authentication parameter) where standard encryption procedures require too large a block size. By using a different permutation on each round, one is able to use the same key for m-bit encryption on each pass, thereby avoiding the computational load of having to set up a different encryption for each round.

BRIEF DESCRIPTION OF THE DRAWINGS

FIG. 8 is a flowchart showing the operational steps performed for the 32-bit encipherment step shown in FIG. 4.

FIG. 10 is a flowchart showing the operational steps performed for the 32-bit decipherment step shown in FIG. 6.

DESCRIPTION OF THE PREFERRED EMBODIMENTS

Introduction

Figure 1:
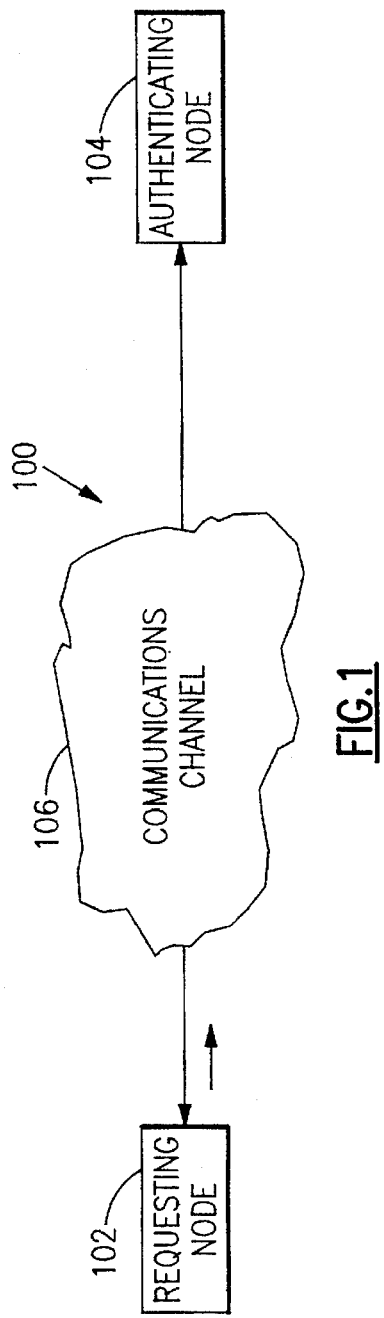
FIG. 1 is a schematic block diagram of a system in which the present invention may be used.

Referring first to FIG. 1, a system 100 employing the present invention comprises a requesting node 102 and an authenticating node 104 interconnected by a communications channel 106. Requesting node 102 may comprise a personal computer such as an IBM PS/2 personal computer or a workstation such as an IBM RISC System/6000 workstation, while authenticating node 104 may comprise a host computer such as one of the IBM System/390 series having an ES/9000 processor. (IBM, PS/2, RISC System 6000, System/390 and ES/9000 are trademarks of IBM Corporation.) Communications channel 106 may comprise any suitable type known to the art.

Figure 3:
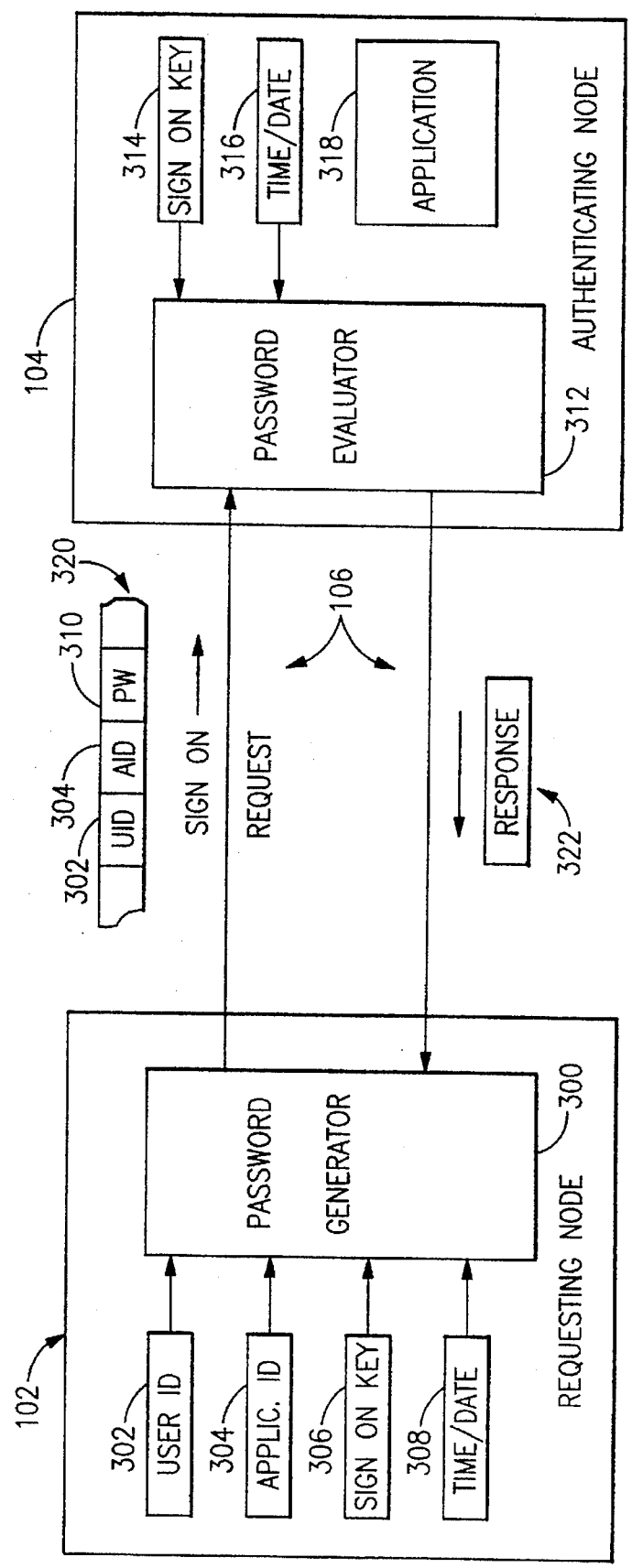
FIG. 3 is a schematic block diagram showing further details of the system shown in FIG. 1.

Referring now to FIG. 3, the requesting node 102, which is assumed to be a personal computer or workstation, contains a one-time password generator 300, preferably implemented as a software routine executing on the central processing unit (CPU) (not separately shown) of the machine constituting the requesting node. (Alternatively, some or all of the password generator 300 may be implemented using special-purpose hardware.) The requesting node machine 102 also has memory locations for storing a user ID (UID) 302 identifying the user, an application ID (AID) 304 identifying the host application being accessed, a signon key (K) 306 used as a key for the encryptions to be described, and a time/date value (T) 308. As indicated in FIG. 3, values 302–308 provide inputs to the password generator 300.

Password generator 300 is invoked when a user wishes to access a host application. When invoked, the password generator generates a one-time password 310 as a function of the user ID 302, application ID 304, signon key 306 and time/date 308. Password 310 is transmitted to the authenticating node 104, together with the user ID 302 and application ID 304, as part of a signon request 320.

The authenticating node 104, which is assumed to comprise a host computer, contains a password evaluator 312 which, like the password generator 300, is preferably implemented as software executing on the CPU (not separately shown) of the machine constituting the authenticating node. The authenticating node machine 104 also contains at least one host application 318 which may be accessed by a user at requesting node 102 upon presentation of a valid password 310. The password evaluator 312 may be either a separate program or part of a security software program such as the IBM Resource Access Control Facility (RACF). (RACF is a trademark of IBM corporation.) Authenticating node 104 stores its own copy of the signon key (K) 314, which is not entrusted to the communications channel 106, as well as a reference time/date (TREF) 316.

Password evaluator 312 receives as inputs the local signon key 314 and the signon request 320 from requesting node 102, which contains the one-time password 310, the user ID 302, and the application ID 304 identifying the host application 318. In a manner to be described, password evaluator 312 uses these quantities to regenerate the original time/date 308, which is compared with the reference time date 316 to determine whether the difference between the two is within a predetermined tolerance (e.g., ±10 minutes). If so, the password evaluator 312 authenticates the user and grants access to the application; otherwise, the evaluator denies access. In either event, the password evaluator sends a message 322 to the requesting node 102 advising of the disposition of the signon request 320.

Figure 2:
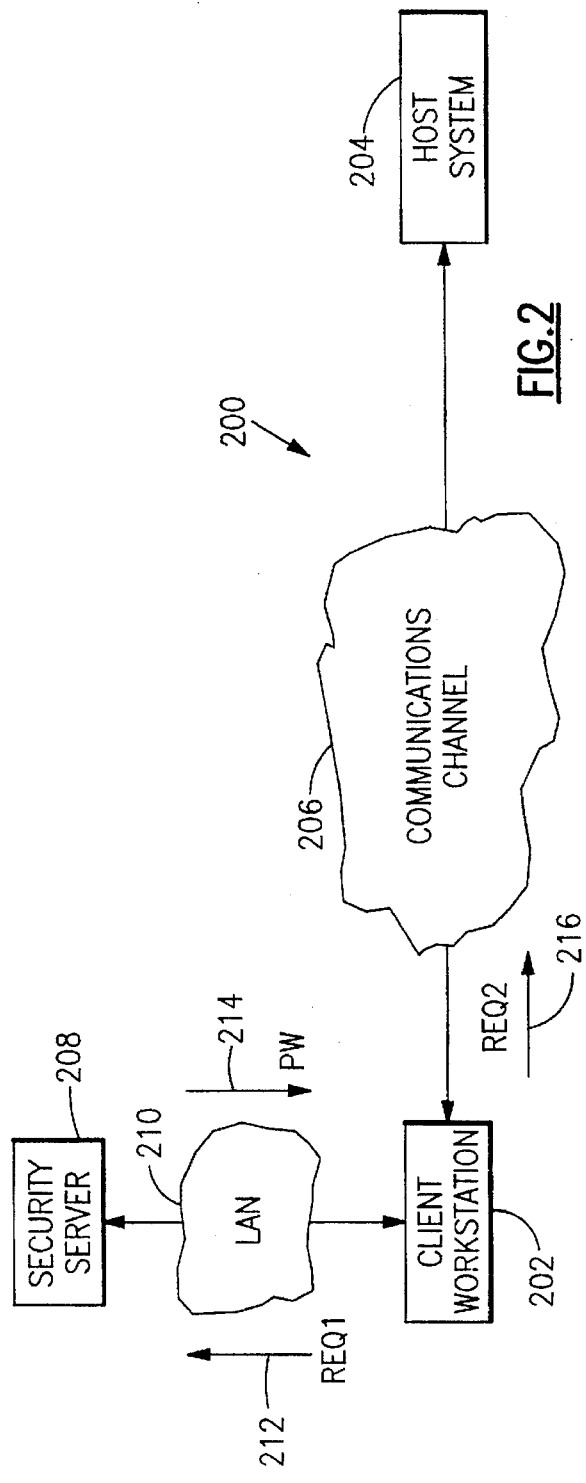
FIG. 2 is a schematic block diagram of a modified system in which the passwords are generated by a security server.

FIG. 2 shows how the present invention may be implemented in a client/server environment, with the resource-requesting function split between a client workstation and a security server workstation. The system 200 shown in FIG. 2 comprises a client workstation 202 coupled to an authentication node 204 via a communications channel 206 and to a security server workstation 208 via a local area network (LAN) 210. (Client workstation 202, security server 208 and LAN 210 may be viewed collectively as a single requesting node from the standpoint of the authenticating node 204.) Authenticating node 204 and communications channel 206 of system 200 may be similar to the corresponding elements 104 and 106 of system 100. As with requesting node 102 of system 100, client workstation 202 and server workstation 208 may comprise personal computers or workstations. LAN 210 may comprise any suitable type known to the art, such as a token-ring LAN or the like.

The authentication sequence on system 200 is as follows. A workstation user stationed at client workstation 202 first authenticates himself to the LAN 210 by entering his LAN security server authentication password. (The method for authenticating the user to the LAN 210 is outside the purview of this invention; any of several methods well known in the art, as well as that disclosed in the present application, may be used.) After authenticating himself to the LAN 210 and the security server 208, the user may wish to access a host application through a workstation (client) function. A request (REQ1) 212, which contains information identifying the user and the host application being accessed, is sent from the client 202 to the server 208 via LAN 210. The server 208 uses this information, together with time/date information and a signon key, to generate a one-time password (PW) 214 for accessing the host application. The one-time password 214 is returned through the LAN 210 to the client 202, which transmits a signon request (REQ2) 216 containing the password together with the user and application information to the authenticating node 204. The authenticating node 204 processes the request 216 in a manner similar to the authentication node 104 of FIGS. 1 and 3.

Password Generation

Figure 4:
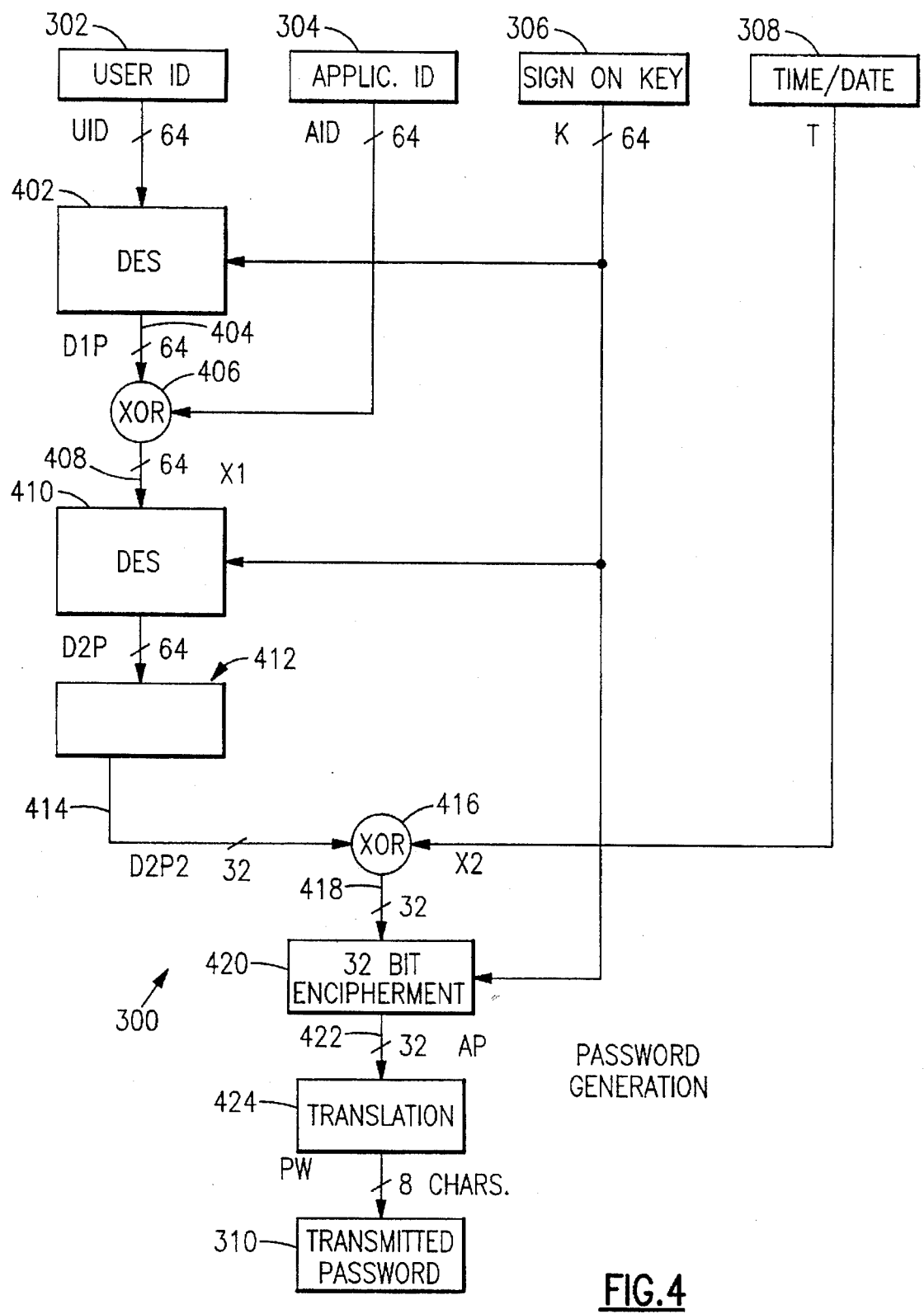
FIG. 4 is a schematic block diagram showing the data transformations performed by the password generator shown in FIG. 3.
Figure 5:
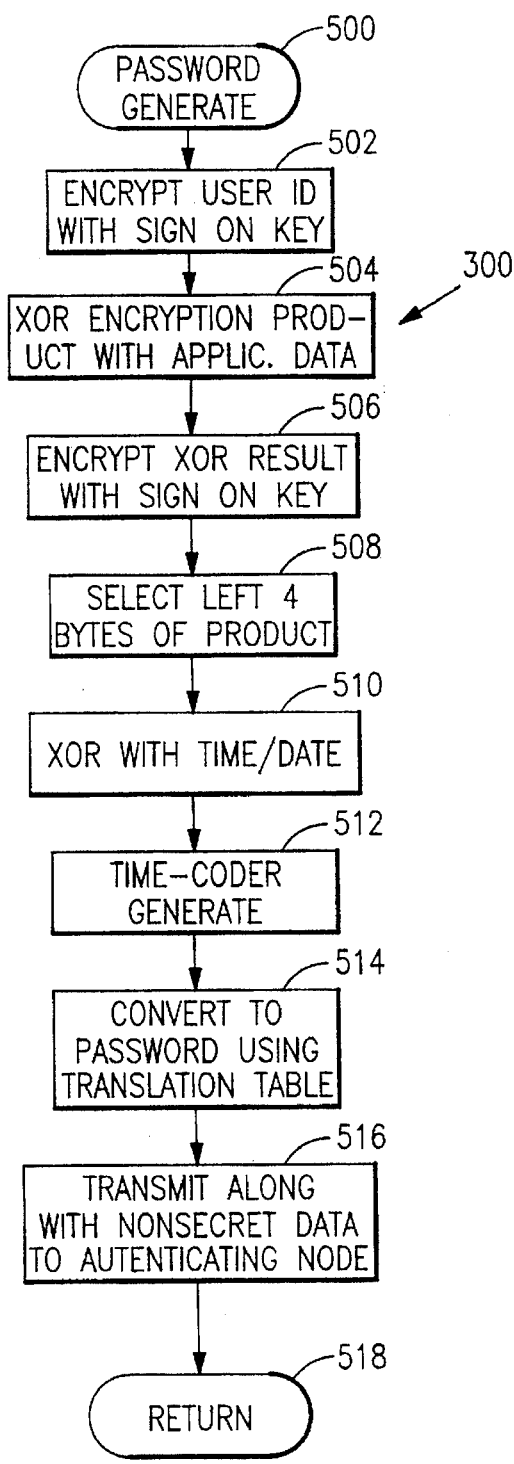
FIG. 5 is a flowchart showing the operational steps performed by the password generator shown in FIG. 3.

FIGS. 4 and 5 show the procedure used by the password generator 300 (FIG. 3) to generate a one-time password 310 as a function of a secret quantity (the host signon key 306), nonsecret information 302 and 304 identifying the user and the host application, and time/date information 308. FIG. 4 shows the procedure in terms of the data transformations involved, while FIG. 5 shows the process steps performed by the preferred software implementation.

As already noted and as shown in FIG. 4, the password generator 300 has four inputs: the host user ID (UID) 302, an application ID (AID) 304 identifying the host application 318 being accessed, a host signon key (K) 306, and the time/date (T) 308.

The user's host user ID 302 for the host application 318 is left-justified and padded to the right with blanks to a length of 8 bytes (64 bits). The application ID 304 is also left-justified and padded to the right with blanks to a length of 8 bytes. The user ID 302 and application ID 304 are in text form (typically ASCII or EBCDIC, depending on implementation) when they are actually used by the password generator 300. The signon key 306 (together with the matching signon key 314 stored at the authenticating node 104) similarly consists of 8 bytes, or 64 bits, of which 56 bits may be independently specified while the remaining 8 bits are parity bits. Preferably, different matching signon keys 306 are used for each host application being accessed. To facilitate this, the signon keys may be stored in a table (not shown) where they are accessed using the application ID 304.

The time/date information 308 (together with the reference time/date 316 generated by the authenticating node 104) indicates the number of time intervals of specified duration that have elapsed since a predefined start time. In the embodiment shown, the time/date information 308 represents the number of seconds that have elapsed since Jan. 1, 1970, at 0000 GMT. (The term "time/date" is used because the value as a whole indicates both the time of day (TOD) and the date; there are no separate fields for these two quantities.) The time/date input 308 is a 4-byte-long binary integer derived using a TIME macro or comparable programming function to obtain the time from the clock on the machine located at the node in question. Various programming languages support such a function. For example, in the C language, time in the required format could be obtained by the following code. Assuming variable 'ts' is declared as 'long', then invoking the function time(&ts) will return in variable 'ts' the number of seconds expired since Jan. 1, 1970, at 0000 GMT expressed as an unsigned long integer.

Referring still to FIGS. 4 and 5, to generate a one-time password 310, the user's host user ID 302 is first encrypted (step 502) using an appropriate encryption procedure (block 402), with the signon key 306 as the encryption key, to generate a 64-bit encryption product 404 (D1P).

Unless otherwise indicated, all encryptions described herein are done using a "one-way" implementation of the standard Data Encryption Standard (DES) procedure, which is identified in the Federal Information Processing Standard 46-1 of the Computer Systems Laboratory in Gaithersburg, Md., of the National Institute of Standards and Technology (NIST) of the United States Government. DES is a national (ANSI X9.9) and international (ISO 8730 and 8731) standard and has wide acceptance in industry and government. In addition to the source described above, DES is also described in C. H. Meyer and S. M. Matyas, *Cryptography: A new Dimension in Computer Data Security* (1982), especially at pages 113–191 and 651–670.

As noted above, the user ID 302 comprises 8 bytes of alphanumeric characters in the range of A–Z and 0–9, with trailing blanks. (The alphanumeric characters are typically ASCII or EBCDIC, depending on the implementation; in a RACF implementation, for example, EBCDIC characters are used.) One-way implementation of the DES procedure means that only the DES encoder is involved, not both the encoder and decoder. General DES encryption and decryption of data is not done with this implementation.

The 64-bit DES product 404 (D1P) of the first DES encryption pass is combined bitwise (step 504) with the application ID 304 using an exclusive OR (XOR), or modulo 2 addition, operation (block 406). In this operation, as is well known in the art, like bit inputs produce a 0 bit output while unlike bit inputs produce a 1 output. The result (X1) 408 of the XOR operation 406 is encrypted (step 506) using the DES procedure 410, with signon key 306 as the encryption key, to generate a second 64-bit encryption product 412 (D2P). Those familiar with cryptographic techniques will recognize the flow (blocks 402–410) to be a Common Cryptographic Architecture (CCA) standard Message Authentication Code (MAC) procedure. The left 4 bytes 414

(D2P2) of the second encryption product 412 (D2P) are selected (step 508), and the right 4 bytes are discarded.

The 32-bit encryption product 414 (D2P2) constituting the leftmost 4 bytes of the 64-bit product 412 (D2P) is then combined (step 510) with the time/date (T) 308 using another XOR operation 416). The result (X2) 418 of this latter XOR operation, a 32-bit quantity, is passed as input to a 32-bit encipherment routine (block 420) which encrypts the 32-bit quantity 418 (step 512) in a manner shown in FIGS. 8–9 and to be described more fully below. The result of the 32-bit encipherment routine (block 420) is another 32-bit quantity 422 that will be referred to herein as the authentication parameter (AP). The authentication parameter (AP) 422 is passed to a translation routine (block 424) to be described more fully below. The translation routine 424, using a translation table to be described, transforms the 32-bit authentication parameter (AP) 422 into an 8-character string—the one-time password (PW) 310—that is used in the user's host application signon request instead of the user's regular host password (step 514). Finally, the password (PW) 310 is transmitted, along with the nonsecret quantities 302 (UID) and 304 (AID) and other signon information, to the authenticating node 104 (step 516).

Because the transformation of the composite value X2 into the authentication parameter AP is a cryptographic transformation, the AP values (as well as the values of the corresponding passwords PW) for successive time values T are highly random in appearance; to a person without the key K, knowledge of the AP or password value for one time period provides no useful information about the value for another time period, even if it is the very next period.

Password Evaluation

Figure 7:
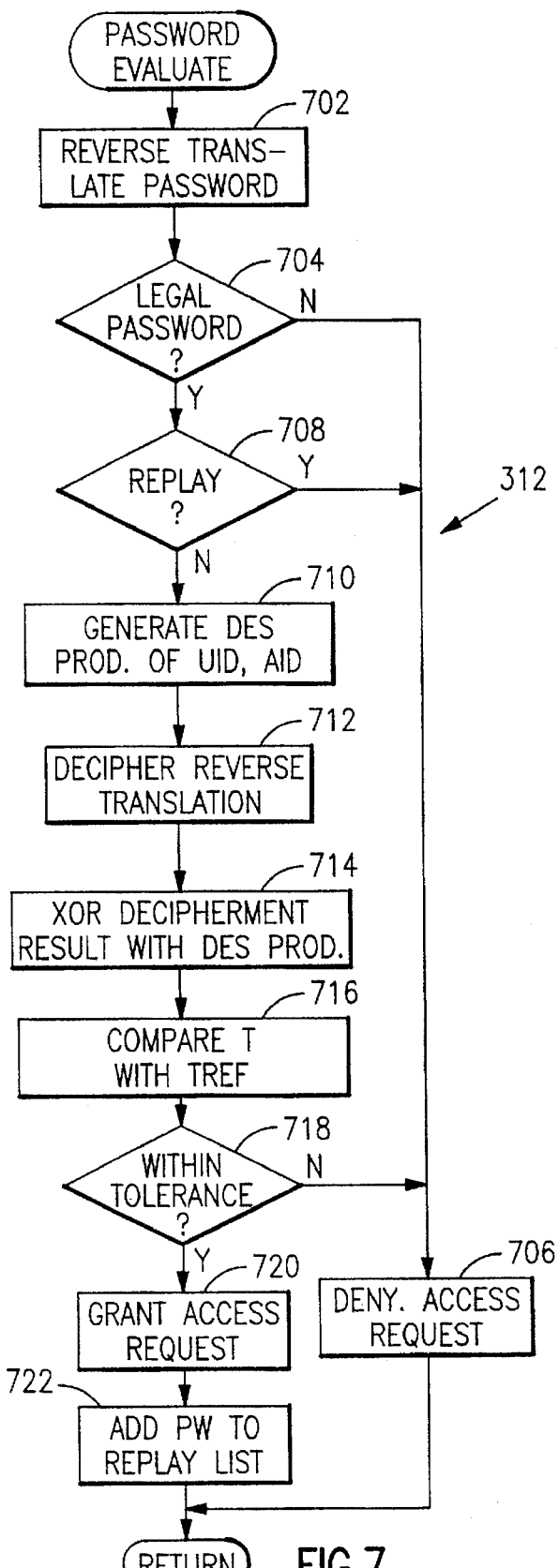
FIG. 7 is a flowchart showing the operational steps performed by the password evaluator shown in FIG. 3.
Figure 6:
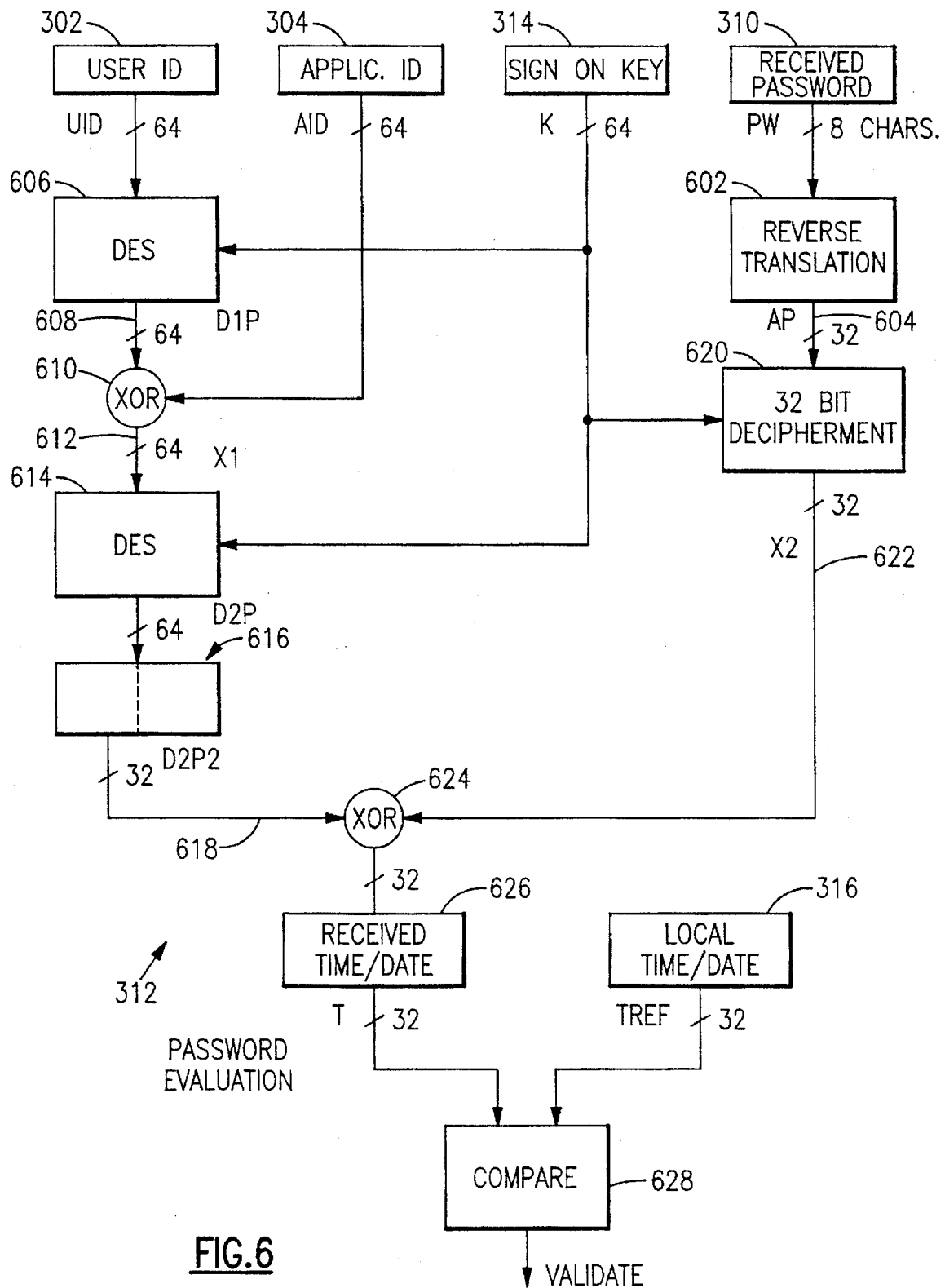
FIG. 6 is a schematic block diagram showing the data transformations performed by the password evaluator shown in FIG. 3.

FIGS. 6–7 show the procedure used by the password evaluator 312 at the authenticating node 104 (FIGS. 1 and 3) to evaluate an authentication request 320 containing a one-time password (PW) 310, a user ID (UID) 302 and an application ID (AID) 304 received from a requesting node. As with FIGS. 4–5, FIG. 6 shows the procedure in terms of the data transformations involved, while FIG. 7 shows the process steps performed by the preferred software implementation.

Upon receiving a signon request containing a one-time password (PW) 310, the password evaluator 312 first attempts to reverse translate the password 310 (step 702), using a reverse translation procedure 602 described further below. This attempt results in the regeneration of the 32-bit authentication parameter AP (604) if the received password corresponds to a legal password (i.e., a password that could have been generated from some value of the 32-bit AP 422 inputted to the translation routine 424). If the reverse translation procedure 602 determines that the received password 310 does not correspond to a legal password (step 704), then the password evaluator 312 denies access (step 706) without further processing, since the received password represents either an attempt to break into the system or a corruption of data.

If the received password 310 does correspond to a legal password, then the password evaluator 312 determines whether the received password is identical to any valid password received over a predefined time interval (step 708); the interval is 10 minutes in the disclosed embodiment, but may be more or less if desired. If the received password is identical to a password received within the defined time interval, the just-received password is rejected as a "replay" of the previously received password (step 706). Since the valid password for a given used ID and application ID changes every second in the disclosed embodiment, the only realistic manner in which an identical password could be generated is by interception of a previously transmitted password (e.g., as it traverses the communications channel 106) and "replay" of that password by injecting it back into the system.

If the received password is not a replay of the previously generated password, the password evaluator 312 proceeds (step 710) to generate a 32-bit encryption product D2P2 (618) in a manner similar to the generation of the corresponding product D2P2 (414) by the password generator 300, except that the key used is the signon key K (314) stored at the authenticating node 104. If, as in the preferred embodiment, the signon key K varies with the host application, then the host signon key 314 may be obtained by accessing the entry in a local table (not shown) corresponding to the received application ID (AID) 306. Portions 606–616 of the password evaluation procedure 312, which generate the 32-bit encryption product D2P2 (618), are identical to the corresponding portions 402–412 of the password generation procedure 300.

Figure 11:
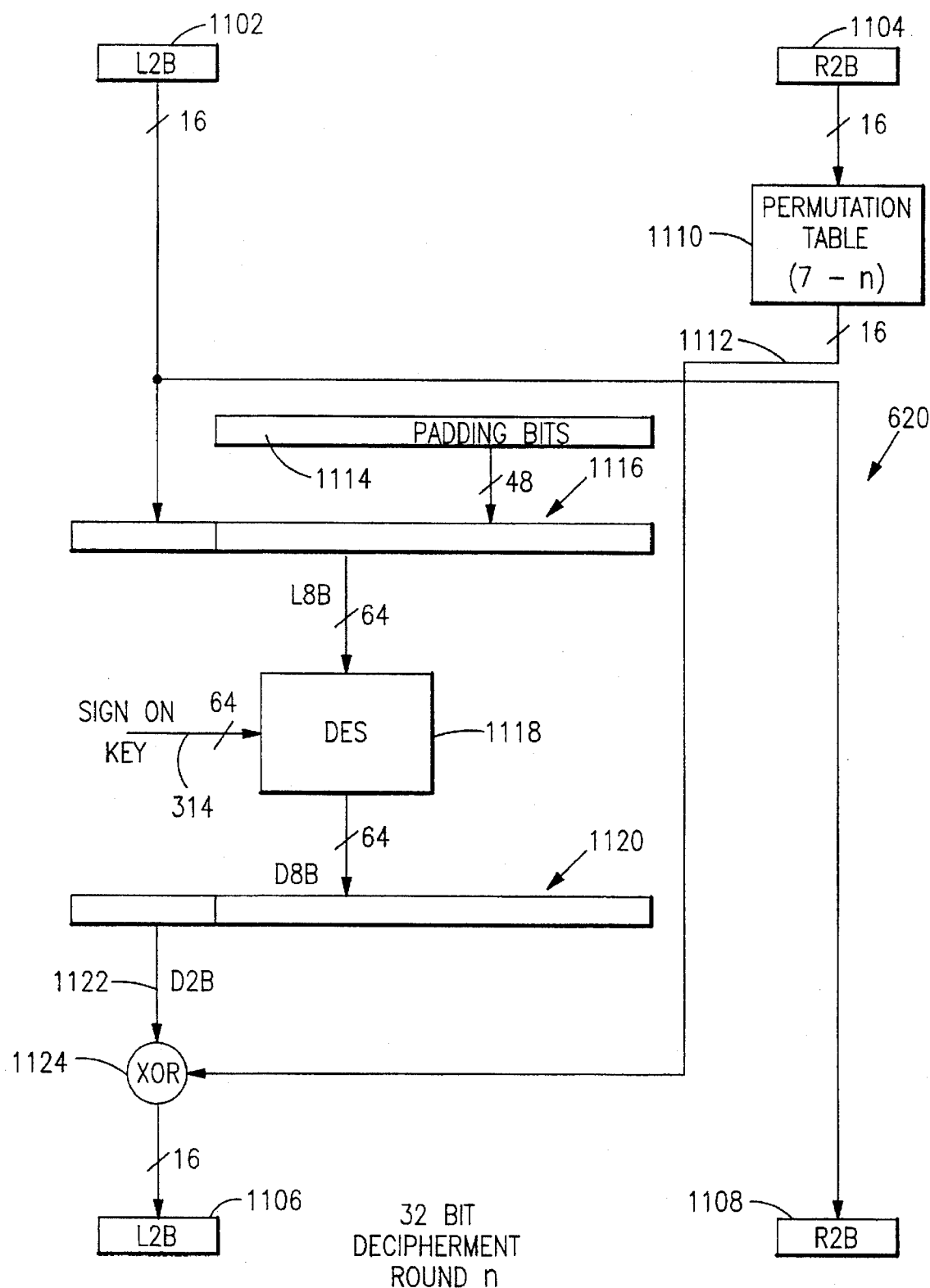
FIG. 11 is a schematic block diagram showing the data transformations performed for the 32-bit decipherment step shown in FIG. 6.

Next (step 712), the regenerated 32-bit AP 604 is passed to a 32-bit decipherment routine 620 corresponding to the 32-bit encipherment routine 420 of the password generator 300. This routine, which is shown in FIGS. 10 and 11 and is discussed in more detail below, converts the encrypted 32-bit AP 604 to a decrypted 32-bit quantity (X2) 622. The latter quantity 622, which corresponds to the unencrypted 32-bit quantity X2 (418) of FIG. 4, is then combined (step 714) with the 32-bit encryption product DP2P (618), using an XOR operation 624, to regenerate a time/date value T (626).

The regenerated value T (626) is compared (step 716) with the reference time/date value TREF (316) generated locally by the authenticating node 104, using a suitable comparison routine 628. If the regenerated value T (626) is outside a predetermined tolerance (e.g., ±10 min) of TREF (316) (step 718), the password evaluator 312 denies access (step 706), since the password does not correspond to a valid time period.

If the regenerated value T (626) is within the predetermined tolerance, the evaluator 312 validates the requestor and grants the request for access to the host application 318 (step 720). In addition, the validated password is added to a queue of comparison passwords for replay detection (step 722). Validated passwords are added to the queue in order of their generation time T (as kept by the particular requesting node) rather than their arrival time as indicated by the host time TREF (which may differ from T). They are purged from the queue when their generation time T falls more than 10 minutes behind the current host time TREF, since by that time they are stale and cannot be successfully replayed into the system. This purging occurs upon the validation of a password (after step 720), as well as just before checking the queue for a reused password (at step 708).

The flowchart shown in FIG. 7 assumes that all of the steps are performed sequentially. Alternatively, the steps for generating the non-time-dependent value D2P2 (step 710) can be performed in parallel with the steps for regenerating the composite value X2 (steps 702, 704, 710 and 712), since neither of these portions of the routine depends on the results of the other. If this is done, then the regeneration of the time-of-day value T can be performed immediately upon the availability of X2, without having to delay further while awaiting the generation of D2P2. (The X2 leg dominates timewise, since the 32-bit decryption routine performs 6

DES passes, one for each round, whereas the generation of D2P2 requires only 2 DES passes.) Similarly, the replay check (step 708) can be performed in parallel with the remainder of the validating portion of the routine.

Character Translation

Figure 12:
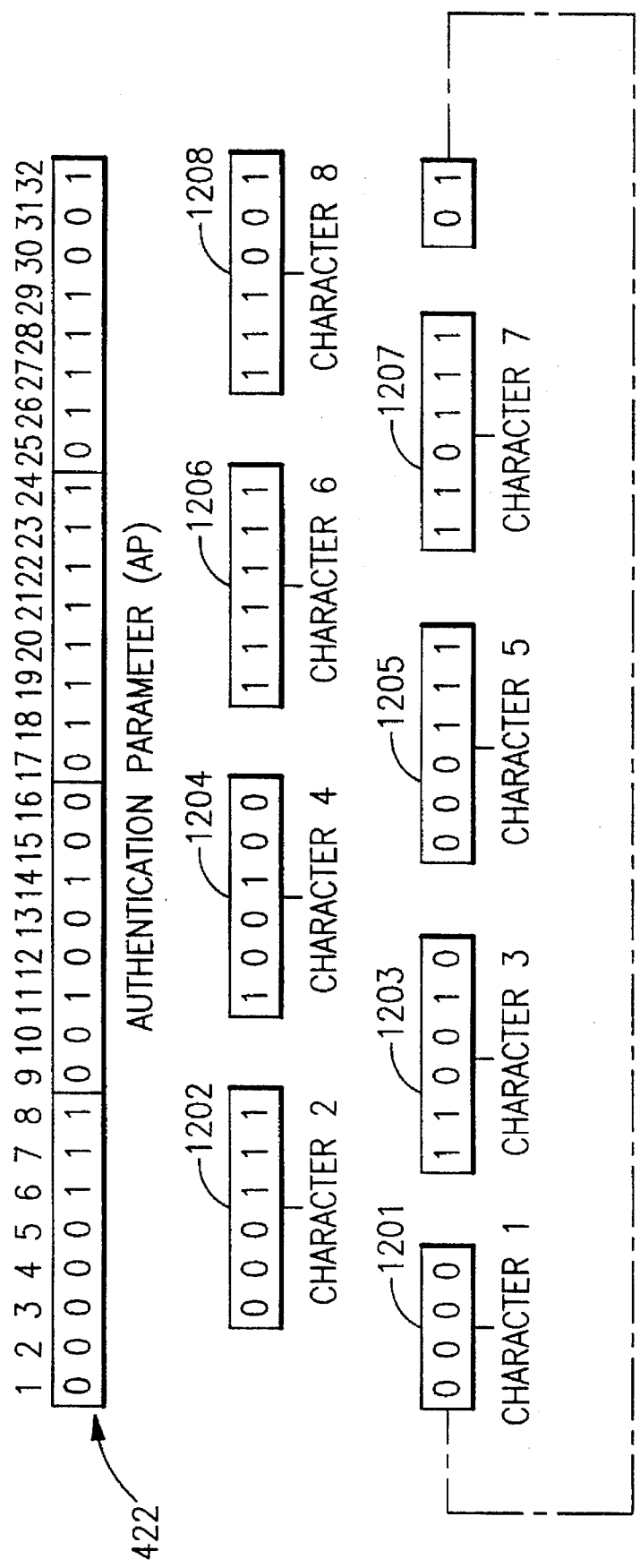
FIG. 12 is a diagram illustrating the translation portion of the password generation routine.

For one-time password generation, the result of step 512, a 32-bit authentication parameter (AP) 422, is translated to 8 alphanumeric characters in the following manner. Referring to FIG. 12, bits 31–32 and 1–4 (6 bits total) are translated to one-time password character position 1 (1201), the leftmost in the 8-byte alphanumeric one-time password field. The translation is done by dividing the binary number, represented by the six bits, by decimal 36 and using the remainder as an index into the translation table. For example, a remainder of 0 translates to a one-time password character of A, while a remainder of 20 translates to a one-time password character of U, and so on.

In like manner, bits 3–8 are translated to one-time password character position 2 (1202), bits 7–12 are translated to one-time password character position 3 (1203), bits 11–16 are translated to one-time password character position 4 (1204), bits 15–20 are translated to one-time password character position 5 (1205), bits 19–24 are translated to one-time password character position 6 (1206), bits 23–28 are translated to one-time password character position 7 (1207), and bits 27–32 are translated to one-time password character position 8 (1208).

This process implements the reuse (or overlapping) of bits so that a 32-bit field can be translated to a unique (for this particular 32-bit value) 8-position field, with each position representing one of 36 possible characters. The process also imparts a particular "signature" to each one-time password correctly generated. This signature, which is unique to the one-time password generation process, is exploited as a performance advantage during the one-time password evaluation process to quickly recognize (before the 32-bit decipherment routine is invoked) 8-character strings that cannot possibly be valid one-time passwords and may therefore be trivially rejected.

Stated somewhat differently, the translation routine generates an authentication code (the password) containing redundancy. That is to say, while each alphanumeric character of the password may be one of 36 characters when considered in isolation, it is limited to one of 16 possible characters when its predecessor is specified (since the overlapping bits would differ otherwise). Passwords lacking this intercharacter correspondence (as would virtually all passwords generated without knowledge of the required correspondence) may be trivially rejected as corrupted passwords or intrusion attempts. The disclosed method of generating passwords containing redundancy is highly desirable in systems such as the one described, since the redundant information is contained in what appears to be an ordinary password of 8 alphanumeric characters. However, other means such as checksums or the like may be used to produce an authentication code containing the desired redundancy. Preferably, noncryptographic techniques such as the one shown are used for this purpose, since they are generally far less computationally intensive for either generating or validating passwords.

The translation table (Table 1) consists of 36 slots. The first 26 slots are occupied by the letters of the alphabet A–Z; the last 10 slots are occupied by the numerics 0–9.

TABLE 1

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| A | B | C | D | E | F | G | H | I | J | K  | L  | M  | N  | O  | P  | Q  | R  |
| 18 | 19 | 20 | 21 | 22 | 23 | 24 | 25 | 26 | 27 | 28 | 29 | 30 | 31 | 32 | 33 | 34 | 35 |
| S | T | U | V | W | X | Y | Z | 0 | 1 | 2 | 3 | 4 | 5 | 6 | 7 | 8 | 9 |

Assuming the result of encipherment step 512 is 07247F79, Tables 2 and 3 illustrate the process of one-time password generation.

TABLE 2

| Byte | 1 | 2 | 3 | 4 |
|---|---|---|---|---|
| Hexadecimal value | 07 | 24 | 7F | 79 |
| Binary | 00000111 | 00100100 | 01111111 | 01111001 |
| Bit Position | 00000000 | 01111111 | 11122222 | 22222333 |
|  | 12345678 | 90123456 | 78901234 | 56789012 |

TABLE 3

| Character Position | Binary | Integer | Remainder | Character |
|---|---|---|---|---|
| 1 | 010000 | 16 × 1/36 => 16 | | Q |
| 2 | 000111 | 7 × 1/36 => 7 | | H |
| 3 | 110010 | 50 × 1/36 => 14 | | O |
| 4 | 100100 | 36 × 1/36 => 0 | | A |
| 5 | 000111 | 7 × 1/36 => 7 | | H |
| 6 | 111111 | 63 × 1/36 => 27 | | 1 |
| 7 | 110111 | 55 × 1/36 => 19 | | T |
| 8 | 111001 | 57 × 1/36 => 21 | | V |

Bits 31–32 and 1–4 (6 bits total) are translated to one-time password character position 1 (leftmost) in the 8-byte alphanumeric one-time password field. The translation is done by dividing the binary number represented by the 6 bits (binary '010000', or decimal 16) by decimal 36, and using the remainder (decimal 16) as an index into the translation table (Table 1). The result is character 'Q'.

Bits 3–8 are translated to one-time password character 'H'. In like manner, bits 7–12 are translated to one-time password character 'O', bits 11–16 are translated to one-time password character 'A', bits 15–20 are translated to one-time password character 'H', bits 19–24 are translated to one-time password character '1', bits 23–28 are translated to one-time password character 'T', and bits 27–32 are translated to one-time password character 'V'.

The resulting one-time password returned as output is QHOAH1TV.

Reverse Translation

The following describes the procedure 602 for generating the 32-bit binary value required for evaluation of candidate one-time passwords. When properly generated this value is used in step 702 to complete the evaluation process.

Figure 13:
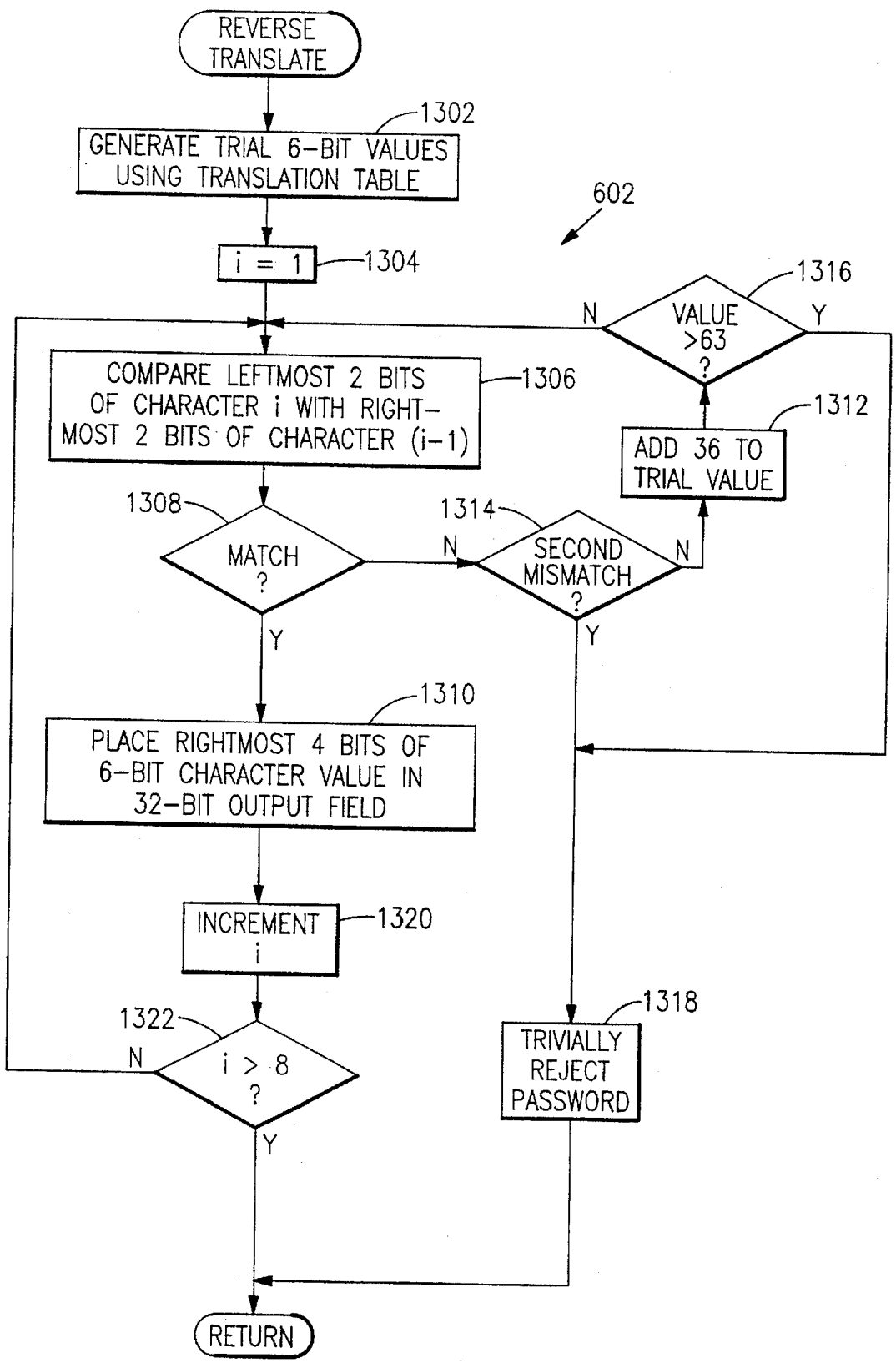
FIG. 13 is a flowchart of the reverse translation routine of the password evaluation routine.

Referring to FIG. 13, each character of the 8-character candidate one-time password is first translated, using the translation table (Table 1), into a 6-bit value (step 1302).

Starting with the leftmost character (character 1) (step 1304), the leftmost 2 bits of the translation of each character are then compared with the rightmost 2 bits of the translation of the previous character (the one to the immediate left of the current character) (step 1306). In the case of the leftmost one-time password character (character 1), there is no previous character, so the rightmost 2 bits of the translation of the last (rightmost) character (character 8) are used instead. (The rightmost character has not been processed at this time; however, the rightmost 2 bits of the translation of this character will not be changed by such subsequent processing.) This is a reverse of the overlap of bits displayed in the one-time password generation translation process.

If these two values are equal (step 1308), then the rightmost 4 bits of the translated value are placed in the output 32-bit field concatenated with (and to the right) of the previously generated 4 bits (step 1310). If these two values are not equal, then decimal 36 is added to the decimal value of the 6-bit translated value (step 1312), and again the leftmost 2 bits of the translation are compared with the rightmost 2 bits of the previous character (step 1306). If these two values are equal (step 1308), then the rightmost 4 bits of the translated value are placed in the output 32-bit field concatenated with (and to the right) of the previously generated 4 bits (step 1310).

If the 2-bit comparisons are not equal by the second try (step 1314), or the value of the result of the addition of 36 to the original character decimal translation value is greater than 63 (step 1316), then processing is stopped because the 8-character one-time password candidate does not contain the "signature" of a valid one-time password, and so cannot be a valid one-time password; the password is therefore trivially rejected (step 1318). Refer to the discussion of the use of the translation table (Table 1) for one-time password generation for explanation of the concept of the one-time password signature.

This process is repeated for each of the 8 characters in the candidate one-time password field (steps 1318–1320). The result is a 32-bit binary field which is the input to step 704 of one-time password validation.

Assuming the candidate one-time password is QHOAH1TV, Table 4 illustrates the process of generating the value that is required by step 708 during one-time password evaluation. A step-by-step description of the flow illustrated by the table follows.

TABLE 4

| One-time PW Character Position | Char | Int | Binary | Compare | Use |
| --- | --- | --- | --- | --- | --- |
| 1 | Q | 16 | 01 0000 | 01 = 01 | 0000 |
| 2 | H | 7 | 00 0111 | 00 = 00 | 0111 |
| 3 | O | 14 | 00 1110 | 11 ≠ 00 | |
| | | +36 50 | 11 0010 | 11 = 11 | 0010 |
| 4 | A | 0 | 00 0000 | 10 ≠ 00 | |
| | | +36 36 | 10 0100 | 10 = 10 | 0100 |
| 5 | H | 7 | 00 0111 | 00 = 00 | 0111 |
| 6 | 1 | 27 | 01 1011 | 11 ≠ 01 | |
| | | +36 63 | 11 1111 | 11 = 11 | 1111 |
| 7 | T | 19 | 01 0011 | 11 ≠ 01 | |
| | | +36 55 | 11 0111 | 11 = 11 | 0111 |
| 8 | V | 21 | 01 0101 | 11 ≠ 11 | |
| | | +36 57 | 11 1001 | 11 = 11 | 1001 |

The first character 'Q' is translated, using the translation table (Table 1) in reverse, into its corresponding decimal value 16 which is binary '010000'. Because this is the first character and there are no predecessors, the rightmost two bits of the last character 'V', which translates into decimal 21 (binary '010101') are binary '01' (These two bits will not change, even if the translation of character 8 is, as here, later augmented by 36; since 36 mod 4=0, only the more significant bits will be affected.) These bits are compared with the leftmost 2 bits of the translated 'Q' which are '01'. They are equal, so the rightmost 4 bits of the translation are placed in the 32-bit output field in bit positions 1–4.

The second character, '7', is translated in like manner into binary '000111'. The rightmost two bits of the previous character, 'Q', which are '00' are compared with the leftmost 2 bits of the translated '7' which are '00'. They are equal, so the rightmost 4 bits of the translation are placed in the 32-bit output field in bit positions 5–8.

The third character, '0', is translated in like manner into decimal 14, binary '001110'. The rightmost two bits of the previous character, '7', which are binary '11' are compared to the leftmost 2 bits of the translated '0' which are binary '00'. They are not equal, so decimal 36 is added to the decimal 14 resulting in decimal 50 which is translated into binary '110010'. Again, the rightmost two bits of the previous character '7', which are binary '11' are compared to the leftmost 2 bits of the translated '0' which are now (after the addition of decimal 36) binary '11'. This time they are equal so the rightmost 4 bits of the translation which are binary '0010' (after the addition of decimal 36) are placed in the 32-bit output field in bit positions 9–12.

The process is repeated for each of the remaining one-time password character positions 5–8, resulting in the population of output bit positions: 13–16, 17–20, 21–24, 25–28 and 29–32. The 32-bit field shown in Table 5 is the result. The regenerated 32-bit field matches the original that was produced when the one-time password was generated.

TABLE 5

| Regenerated | 00000111 00100100 01111111 01111001 |
| --- | --- |
| Binary original | 00000111 00100100 01111111 01111001 |

32-Bit Encipherment

Figure 9:
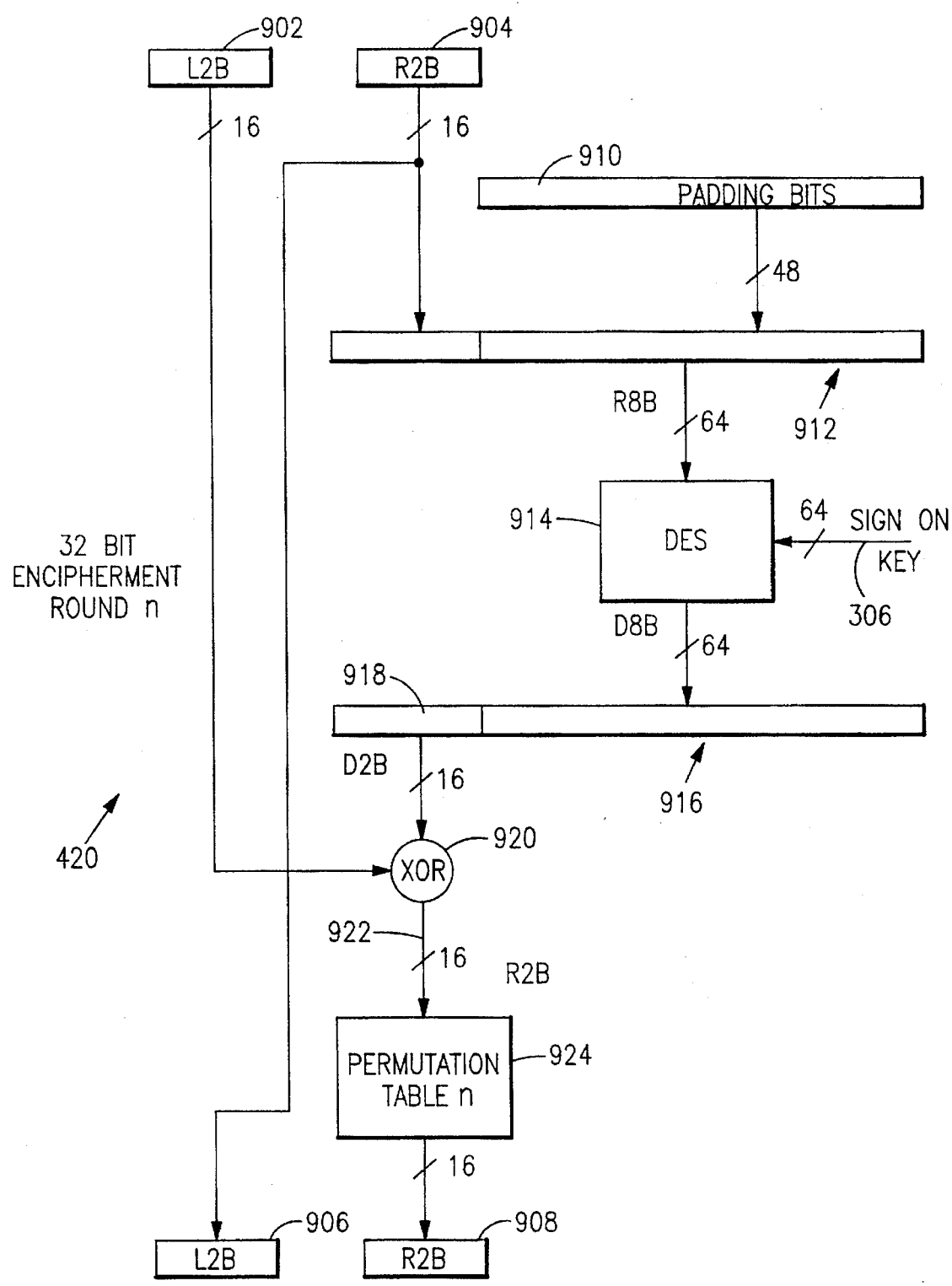
FIG. 9 is a schematic block diagram showing the data transformations performed for the 32-bit encipherment step shown in FIG. 4.

FIGS. 8–9 show the 32-bit encipherment routine performed by the password generator 300 at the requesting node 102 (FIG. 3); while FIGS. 10–11 show the 32-bit decipherment routine performed by the password evaluator 312 at the authenticating node 106. FIG. 8 shows the process steps performed by the encipherment routine, which involves a number of iterations or "rounds", while FIG. 9 shows the data manipulations performed on each round of the encipherment routine. In a similar manner, FIG. 10 shows the process steps performed by the decipherment routine, while FIG. 11 shows the data manipulations performed on each round of the decipherment routine.

Referring first to FIGS. 8–9, upon entering the 32-bit encipherment routine, the 32-bit input is divided into two portions: L2B (the left 2 bytes) and R2B (the right 2 bytes) (step 802). The routine then performs 6 iterations (referred to as "rounds" herein) of a loop comprising steps 804–816, in which L2B and R2B are subjected to various operations, before recombining the two halves (step 818) and exiting the 32-bit encipherment routine.

As shown in FIG. 9, each round n starts with left and right input halves L2B (902) and R2B (904), which are transformed into left and right output halves L2B (906) and R2B (908) for use in the next round (n+1).

On each round, the right input half 904 (R2B) is first concatenated (step 804) with 6 bytes of padding bits 910 consisting of hexadecimal X'555555555555' to form an 8-byte (64-bit) quantity 912 (R8B), such that the 2 bytes of R2B occupy the leftmost 2 byte positions of R8B. R8B is then encrypted (step 806) using DES (block 914), with the signon key 306 as the encryption key, to produce an encryption product 916 (D8B). The left 2 bytes of the encryption product D8B are isolated (step 808), forming D2B (918); the right 6 bytes are discarded.

The result 918 of step 808 (D2B) is then combined (step 810) with L2B from step 802, using the exclusive OR (XOR), or modulo 2 addition, operation 920. The left output half 906 (L2B) for the round is then set equal to the right input half 904 (R2B), after which the right half R2B is set equal to the result 922 of the XOR operation 920 (step 812). After this, R2B is permuted (i.e., its bits are transposed) (step 814) according to Permutation Table n (block 924), where n is the number of the round (loop count), to generate the right output half R2B (908). For example, for the first time through, n=1.

In step 816, a test is made of the number of rounds that have been completed. If the value is less than 6, the routine continues for another round, beginning at step 804.

If 6 rounds have been completed, then processing continues with step 818. In step 818, L2B (left 2 bytes) and R2B (right 2 bytes) are recombined into a 32-bit string, completing the 32-bit encryption procedure.

32-Bit Decipherment

The 32-bit decipherment routine is shown in FIGS. 10 and 11. Upon entering the routine, the 32-bit input is divided (step 1002) into two portions: the left two bytes L2B (1102) and the right two bytes R2B (1104). The routine then performs 6 iterations ("rounds") of a loop (steps 1004–1016) in which L2B and R2B are subjected to various operations before recombining the two halves (step 1018) and exiting the 32-bit decipherment routine.

As shown in FIG. 11, each round n starts with left and right input halves L2B (1102) and R2B (1104), which are transformed into left and right output halves L2B (1106) and R2B (1108) for use in the next round (n+1).

On each round, the right input half R2B is first permuted (step 1004) according to Permutation Table (7−n) (block 1110), where n is the number of the round or loop count, to produce a permuted right input half R2B (1112). For example, for the first time through (n=1), Permutation Table 6 is used. Next, L2B (2 bytes) is concatenated (step 1006) with 6 bytes of padding bits 1114 consisting of hexadecimal X'555555555555' to form an 8-byte (64-bit) quantity L8B (1116), such that the 2 bytes of L2B occupy the leftmost 2 byte positions of L8B. L8B is encrypted (step 1008) using DES (block 1118), with the authentication copy of the secured signon key 314 as the encryption key, to produce an encryption product D8B (1120). The left 2 bytes of the encryption product D8B are isolated (step 1010), forming D2B (1122); the right 6 bytes of D8B are discarded. The result D2B of step 1010 is combined (step 1012) with R2B, as permuted from step 1004, using the XOR (modulo 2 addition) operation 1124. The right output half R2B (1108) is then set equal to the left input half L2B (1102), after which the left output half L2B (1106) is set equal to the result of the XOR operation (step 1014).

In step 1016, a test is made of the number of rounds that have been completed. If the value is less than 6, the 32-bit decipherment continues for another round, beginning at step 1004.

If 6 rounds have been completed, then processing continues with step 1018. In step 1018, the left half L2B and right half R2B obtained at the end of round 6 are recombined into a 32-bit string, completing the processing.

Permutation Tables

The six permutation tables reproduced below are used in the following manner. The upper of the two rows of numbers (Out) represent the output positions (from left to right) of the 16 bits being permuted. The lower of the two rows (In) represents the input bit positions. For example, using Permutation Table 1, output bit position 1 consists of the bit (on or off) in input bit position 10. Output bit position 2 consists of the bit in input bit position 2, and so on.

Each of the permutations shown in the tables below is its own inverse; that is to say, if the same permutation is applied twice, the input bits are regenerated in their original order. This implies that if bit i of the input becomes bit j of the output, the converse permutation also occurs so that bit j of the input becomes bit i of the output; the trivial case of i=j, in which an input bit retains its original position, is also allowed. Permutations that are not their own inverses could alternatively be used, but this would require a separate set of permutations for the decipherment rounds that are the inverses of the permutations used in the corresponding encipherment rounds.

Although the disclosed 32-bit encipherment/decipherment routine has particular utility in the authentication system disclosed herein, either or both of the encipherment and decipherment portions may also be used independently with other data sources or data sinks. Also, blocks of other than 32 bits may be provided for by suitably modifying the bit-padding and truncating portions of the routine. The permutation step may be moved to other points in the encipherment routine, provided it is correspondingly moved to an appropriate point in the decipherment routine.

| Permutation Table 1 | | | | | | | | | | | | | | | |
|---|---|---|---|---|---|---|---|---|---|---|---|---|---|---|---|
| Out | 1 | 2 | 3 | 4 | 5 | 6 | 7 | 8 | 9 | 10 | 11 | 12 | 13 | 14 | 15 | 16 |
| In | 10 | 2 | 12 | 4 | 14 | 6 | 16 | 8 | 9 | 1 | 11 | 3 | 13 | 5 | 15 | 7 |

| Permutation Table 2 | | | | | | | | | | | | | | | |
|---|---|---|---|---|---|---|---|---|---|---|---|---|---|---|---|
| Out | 1 | 2 | 3 | 4 | 5 | 6 | 7 | 8 | 9 | 10 | 11 | 12 | 13 | 14 | 15 | 16 |
| In | 1 | 10 | 3 | 12 | 13 | 16 | 7 | 15 | 9 | 2 | 11 | 4 | 5 | 14 | 8 | 6 |

| Permutation Table 3 | | | | | | | | | | | | | | | |
|---|---|---|---|---|---|---|---|---|---|---|---|---|---|---|---|
| Out | 1 | 2 | 3 | 4 | 5 | 6 | 7 | 8 | 9 | 10 | 11 | 12 | 13 | 14 | 15 | 16 |
| In | 3 | 10 | 1 | 12 | 13 | 16 | 9 | 15 | 7 | 2 | 14 | 4 | 5 | 11 | 8 | 6 |

| Permutation Table 4 | | | | | | | | | | | | | | | |
|---|---|---|---|---|---|---|---|---|---|---|---|---|---|---|---|
| Out | 1 | 2 | 3 | 4 | 5 | 6 | 7 | 8 | 9 | 10 | 11 | 12 | 13 | 14 | 15 | 16 |
| In | 10 | 4 | 12 | 2 | 14 | 8 | 16 | 6 | 9 | 1 | 13 | 3 | 11 | 5 | 15 | 7 |

| Permutation Table 5 | | | | | | | | | | | | | | | |
|---|---|---|---|---|---|---|---|---|---|---|---|---|---|---|---|
| Out | 1 | 2 | 3 | 4 | 5 | 6 | 7 | 8 | 9 | 10 | 11 | 12 | 13 | 14 | 15 | 16 |
| In | 4 | 10 | 12 | 1 | 8 | 16 | 14 | 5 | 9 | 2 | 13 | 3 | 11 | 7 | 15 | 6 |

| Permutation Table 6 | | | | | | | | | | | | | | | |
|---|---|---|---|---|---|---|---|---|---|---|---|---|---|---|---|
| Out | 1 | 2 | 3 | 4 | 5 | 6 | 7 | 8 | 9 | 10 | 11 | 12 | 13 | 14 | 15 | 16 |
| In | 1 | 16 | 15 | 14 | 13 | 12 | 11 | 10 | 9 | 8 | 7 | 6 | 5 | 4 | 3 | 2 |

Conclusion

Various modifications of the disclosed embodiments will be apparent to those skilled in the art. Other nonsecret information such as a workstation ID could be used instead of or in addition to the user ID and application ID to generate the authentication parameter. As noted above, while the authentication system is preferably implemented with software, it may also be implemented in whole or in part by hardware. As also noted above, certain portions of the procedure may be performed in parallel rather than sequentially as described. Further, while the time-of-day value changes each second, other time intervals of greater or lesser duration could be used. Similarly, comparison tolerances of greater or less than 10 minutes could be used. Although the disclosed embodiments involve workstations that access applications on host computers, other types of requesting nodes and authenticating nodes are within the scope of the invention. Also, the one-time password generator may be located on a card or other device carried by the user rather than on a fixed workstation.

What is claimed is:

1. In an authentication system, apparatus for generating a time-dependent password for presentation to an authenticator, comprising:

means for generating an authentication parameter as a function of time-dependent information using a predetermined first transformation having an inverse transformation, said time-dependent information being recoverable from said authentication parameter using said inverse transformation;

means for generating a time-dependent password comprising a character string from said authentication parameter using a predetermined second transformation having an inverse transformation, said authentication parameter being recoverable from said password using said inverse transformation; and means for presenting said password to said authenticator.

2. The apparatus of claim 1 wherein said time-dependent information comprises a value, said apparatus further comprising:

means for regenerating said authentication parameter from the password presented to said authenticator using the inverse of said second transformation;

means for regenerating said time-dependent value from said authentication parameter using the inverse of said first transformation; and means for granting access to a resource if said regenerated time-dependent value is within a predetermined tolerance of a reference time-dependent value, otherwise, denying access to said resource.

3. In a system in which a valid password is generated by generating an authentication parameter as a function of a time-dependent value using a predetermined first transformation having an inverse transformation and then generating a time-dependent password comprising a character string from said authentication parameter using a predetermined second transformation having an inverse transformation, said time-dependent value being recoverable from said authentication parameter using the inverse of said first transformation, said authentication parameter being recoverable from said password using the inverse of said second transformation, apparatus for validating a password presented to an authenticator comprising:

means for regenerating said authentication parameter from the password presented to said authenticator using the inverse of said second transformation;

means for regenerating said time-dependent value from said authentication parameter using the inverse of said first transformation;

means for comparing the regenerated time-dependent value with a reference time-dependent value; and means for validating said password if said regenerated time-dependent value is within a predetermined tolerance of said reference time-dependent value, otherwise, rejecting said password.

4. In an authentication system, apparatus for generating and preliminarily validating a password, comprising:

means for generating an authentication parameter from a set of authentication parameters having a first number of members;

means for generating a password from a set of passwords having a second number of members greater than said first number of members from said authentication parameter using a predetermined transformation;

means for presenting said password to an authenticator;

means for determining whether there exists an authentication parameter from which the password presented to said authenticator is generated using said transformation; and means for preliminarily validating said password if there exists such an authentication parameter, otherwise, rejecting said password without further processing.

5. In an authentication system, apparatus for generating a time-dependent authentication code for presentation to an authenticator located at an authenticating node, comprising:

means for generating time-dependent information at a requesting node;

means for combining said time-dependent information with non-time-dependent information to generate composite information, said time-dependent information being combined with said non-time-dependent information in such a manner that said time-dependent information is recoverable from said composite information by combining said composite information with said non-time-dependent information;

means for generating an authentication code from said composite information using a predetermined transformation having an inverse transformation, said composite information being recoverable from said authentication code using said inverse transformation;

means for transmitting said authentication code to said authenticator located at said authenticating node.

6. The apparatus of claim 5, further comprising:

means for regenerating said composite information from the authentication code transmitted to said authenticator using the inverse of said transformation; and means for regenerating said time-dependent information from said composite information by combining said composite information with said non-time-dependent information.

7. Apparatus for transforming an input data block containing n bits into an output data block containing n bits, where n is an even integer, said apparatus comprising:

(a) means for partitioning the input data block into first and second halves each containing n/2 bits;

(b) means for subjecting said halves of said input data block to a plurality of rounds of processing in which first and second input halves are transformed into first and second output halves serving as the corresponding input halves for the subsequent round, said means including means operative on each of said rounds for:

(1) generating a predetermined first function of the first input half;

(2) generating the first output half as a predetermined second function of said predetermined first function and the second input half; and (3) generating the second output half as a predetermined third function of the first input half; at least one of said first, second and third functions involving a permutation of a set of n/2 input bits to yield n/2 output bits, said permutation being different for each of said rounds; and (c) means for recombining said first and second halves to produce said output data block.

8. Apparatus for transforming an input data block containing n bits into an output data block containing n bits, where n is an even integer, said apparatus comprising:

(a) means for partitioning the input data block into first and second halves each containing n/2 bits;

(b) means for subjecting said halves of said input data block to a plurality of rounds of processing in which first and second input halves are transformed into first and second output halves, the output halves of a given round serving as the corresponding input halves for the subsequent round, said means including means operative on each of said rounds for:

(1) padding said first input half with padding bits to generate a m-bit input value, where m is greater than n/2;

(2) encrypting said m-bit input value using a predetermined m-bit encryption procedure to generate a 64-bit output value;

(3) selecting predetermined bits of said m-bit output value to form an n/2-bit output value;

(4) generating the first output half for said round as a function of the modulo 2 sum of said n/2-bit output value and the second input half for said round; and (5) setting the second output half for said round equal to the first input half for said round; and (c) means for recombining said first and second halves to produce said output data block.

9. A program storage device readable by a machine, tangibly embodying a program of instructions executable by the machine to perform method steps for generating a time-dependent password for presentation to an authenticator, said method steps comprising:

generating an authentication parameter as a function of time-dependent information using a predetermined first transformation having an inverse transformation, said time-dependent information being recoverable from said authentication parameter using said inverse transformation; and generating a time-dependent password comprising a character string from said authentication parameter using a predetermined second transformation having an inverse transformation, said authentication parameter being recoverable from said password using said inverse transformation.

10. The program storage device of claim 9, wherein said method steps further comprise:

presenting said password to said authenticator.

11. For use in a system in which a valid password is generated by generating an authentication parameter as a function of a time-dependent value using a predetermined first transformation having an inverse transformation and then generating a time-dependent password comprising a character string from said authentication parameter using a predetermined second transformation having an inverse transformation, said time-dependent value being recoverable from said authentication parameter using the inverse of said first transformation, said authentication parameter being recoverable from said password using the inverse of said second transformation, a program storage device readable by a machine, tangibly embodying a program of instructions executable by the machine to perform method steps for validating a password presented to an authenticator, said method steps comprising:

regenerating said authentication parameter from the password presented to said authenticator using the inverse of said second transformation;

regenerating said time-dependent value from said regenerated authentication parameter using the inverse of said first transformation;

comparing the regenerated time-dependent value with a reference time-dependent value; and validating said password if said regenerated time-dependent value is within a predetermined tolerance of said reference time-dependent value, otherwise, rejecting said password.

12. A program storage device readable by a machine, tangibly embodying a program of instructions executable by the machine to perform method steps for generating a time-dependent authentication code for presentation to an authenticator at an authenticating node, said method steps comprising:

generating time-dependent information at a requesting node;

combining said time-dependent information with non-time-dependent information to generate composite information, said time-dependent information being combined with said non-time-dependent information in such a manner that said time-dependent information is recoverable from said composite information by combining said composite information with said non-time-dependent information; and generating an authentication code from said composite information using a predetermined transformation having an inverse transformation, said composite information being recoverable from said authentication code using said inverse transformation.

13. The program storage device of claim 12 wherein said method steps further comprise:

transmitting said authentication code to said authenticator located at said authenticating node.

14. A program storage device readable by a machine, tangibly embodying a program of instructions executable by the machine to perform method steps for transforming an input data block containing n bits into an output data block containing n bits, where n is an even integer, said method steps comprising:

(a) partitioning the input data block into first and second halves each containing n/2 bits;

(b) subjecting said halves of said input data block to a plurality of rounds of processing in which first and second input halves are transformed into first and second output halves serving as the corresponding input halves for the subsequent round, each of said rounds comprising the steps of:

(1) generating a predetermined first function of the first input half;

(2) generating the first output half as a predetermined second function of said predetermined first function and the second input half; and (3) generating the second output half as a predetermined third function of the first input half; at least one of said first, second and third functions involving a permutation of a set of n/2 input bits to yield n/2 output bits, said permutation being different for each of said rounds; and (c) recombining said first and second halves to produce said output data block.

* * * * *